United States Patent
Luo et al.

(10) Patent No.: US 7,378,040 B2
(45) Date of Patent: May 27, 2008

(54) METHOD OF FORMING FLUOROPOLYMER BINDERS FOR CARBON NANOTUBE-BASED TRANSPARENT CONDUCTIVE COATINGS

(75) Inventors: Jiazhong Luo, Acton, MA (US); David J. Arthur, Norwood, MA (US); Paul J. Glatkowski, Littletown, MA (US)

(73) Assignee: Eikos, Inc., Franklin, MA (US)

( * ) Notice: Subject to any disclaimer, the term of this patent is extended or adjusted under 35 U.S.C. 154(b) by 0 days.

(21) Appl. No.: 11/201,275

(22) Filed: Aug. 11, 2005

(65) Prior Publication Data

US 2006/0113510 A1 Jun. 1, 2006

Related U.S. Application Data

(60) Provisional application No. 60/600,389, filed on Aug. 11, 2004.

(51) Int. Cl.
*H01B 1/00* (2006.01)
(52) U.S. Cl. ............. 252/500; 252/502; 252/511; 427/77; 156/60; 174/546; 423/447.1; 423/445 R
(58) Field of Classification Search .......... 252/500, 252/502, 511; 427/77; 156/60; 174/546; 423/447.1, 445 R
See application file for complete search history.

(56) References Cited

U.S. PATENT DOCUMENTS

2002/0161101 A1* 10/2002 Carroll et al. ............... 524/495
2003/0164427 A1* 9/2003 Glatkowski et al. ..... 244/158 R
2004/0265550 A1* 12/2004 Glatkowski et al. ........ 428/209
2005/0224765 A1* 10/2005 Hsu et al. ................... 252/500

* cited by examiner

Primary Examiner—Mark Kopec
Assistant Examiner—Tri Nguyen
(74) Attorney, Agent, or Firm—Novak Druce + Quigg LLP

(57) ABSTRACT

This invention relates to flexible, transparent and conductive coatings and films formed using carbon nanotubes (CNT) and, in particular, single wall CNT, with polymer binders. Preferably, coatings and films are formed from CNT applied to transparent substrates forming one or multiple conductive layers at nanometer level of thickness. Polymer binders are applied to the CNT network coating having an open structure to provide protection through infiltration, and may comprise a basecoat, a topcoat, or a combination thereof, providing enhanced optical transparency, conductivity, moisture resistance, thermal resistance, abrasion resistance and interfacial adhesion. Polymers may be thermoplastics, thermosets, insulative, conductive or a combination thereof. A fluoropolymer containing binder is applied onto a CNT-based transparent conductive coating at nanometer level of thickness on a clear substrate. The fluoropolymers or blend can be either semi-crystalline or amorphous. This binder coating and the resulting products can be used for display and electronic applications.

14 Claims, 7 Drawing Sheets

METHOD OF FORMING FLUOROPOLYMER BINDERS FOR CARBON NANOTUBE-BASED TRANSPARENT CONDUCTIVE COATINGS

REFERENCE TO RELATED APPLICATIONS

This application claims priority to U.S. Provisional Application No. 60/600,389 entitled "Fluoropolymer Binders for Carbon Nanotube-Based Transparent Conductive Coatings" filed Aug. 11, 2004, and U.S. application Ser. No. 11/014,233 entitled "Polymer Binders for Flexible and Transparent Conductive Coatings having Carbon Nanotubes, and Corresponding Construction Structures, Processes and Articles" filed Dec. 17, 2004, which claims priority to U.S. Provisional Application No. 60/529,735 of the same title filed Dec. 17, 2003, and U.S. Provisional Application No. 60/549,159 entitled "Transparent Conductive Coatings having High and Stable Performance Including Moisture, Heat, Abrasion and Bending Resistance" filed Mar. 3, 2004, all of which are entirely and specifically incorporated by reference.

GOVERNMENT INTERESTS

This invention was made, in part, with government support under Contract No. Fa8650-04-C-5702 awarded by the United States Air Force. Accordingly, United States Government may have certain rights in the invention.

BACKGROUND

1. Field of the Invention

The present invention is directed to flexible, optically transparent and conductive coatings and films comprised of carbon nanotubes (CNT) and polymer binders on optically clear substrates such as PET and glass for display and electronic applications, and to the corresponding fabrication methods, coating layer structures and processes. In particular, the invention is directed to fluoropolymer binders applied to the CNT layer to provide protection and enhancement of properties such as increased electrical conductivity, increased optically transparency, moisture resistance, thermal resistance, abrasion resistance and interfacial adhesion.

2. Description of the Background

Transparent and electrically conductive coatings and films are used for versatile applications particularly in flat panel displays, touch screen panel and other electronic applications. These transparent conductors mainly include metal oxides particularly indium-tin oxide (ITO). (See R. G. Gorden, "Criteria for Choosing Transparent Conductors", *MRS Bulletin,* Page 52, August/2000). ITO is deposited onto glass and polymer substrates by chemical vapor deposition (CVD), sputtering and other approaches followed by annealing. This offers high electrical conductivity and optical transparency. However, ITO-based coating and film have inferior abrasion resistance and flexibility. The supply of expensive indium is also very limited. Transparent conductive products with easier fabrication and higher performance are in great demand.

Intrinsically conductive polymers such as polyaniline and polythiophene are also used to make flexible transparent conductive coating and films. One significant example in poly(3,4-ethylenedioxythiophene) doped and stabilized with poly(styrenesulfonate) (PEDOT/PSS). (See L. Bert Groenendaal, F. Jonas, D. Freitag, H. Pielartzik, J. R. Reynolds, "Poly(3,4-ethylenedioxythiophene) and Its Derivatives: Past, Present, and Future," *Advanced Materials,* Vol. 12, No. 7, pp 481, 2000). However, polymer conductivity and optical transparency are limited. Despite good flexibility, abrasion resistance is also very poor.

Development and application exploration of carbon nanotube have preceded since their discovery in 1991. Nanotubes and nanoparticles are gaining significant attentions due to industrial application potentials. Carbon nanotubes (CNT) of different forms have been discovered including single-wall, dual-wall and multiple-wall. These forms have been incorporated into a number of plastics and films.

Single-wall carbon nanotubes (SWNTs) are manufactured by several methods such as laser ablation, carbon arc and chemical vapor deposition (CVD) including a process using high pressure carbon monoxide (HIPCO). Dilute carbon nanotube dispersions in aqueous or solvent mixtures are referred to as CNT inks.

CNTs include single walled (SWNT), double walled (DWNT) and multi walled carbon nanotubes (MWNT). These forms of CNTs are synthesized by arc-discharge, laser ablation and chemical vapor deposition (CVD), to name a few. (See *Carbon Nanotubes Science and Applications;* edited by M. Meyyappan, CRC Press, 2004). Carbon nanotubes especially SWNT can also have high electrical and thermal conductivity in addition to good mechanical properties.

Carbon nanotubes are generally mixed with polymers (or monomers followed by polymerization) to form nanocomposites. For example, U.S. Pat. No. 6,265,466 relates to electromagnetic shielding composites comprising nanotubes and polymers. Significant research efforts are focusing on preparation of nanocomposites using this approach. The challenges for this approach include difficulty in uniform mixing due to bundles and agglomeration of CNT, and difficulty in achieving very high conductivity due to an insulative nature of polymers.

Transparent conductive coatings and films can be made by incorporating CNT into clear polymers at a desired thickness (See generally U.S. Pat. Nos. 5,583,887 and 5,908,585). U.S. patent application Ser. Nos. 10/105,623 and 10/442,176 relate to transparent conductive coatings and films with or without certain patterning formed by using single-wall carbon nanotubes (SWNT) through a two step method (e.g. formation of CNT layer via wet process followed by polymer binder coating).

During development of these SWNT based transparent conductive coatings having high conductivity (e.g., $10^0$-$10^5$ O/∈), their measured sheet resistance value can fluctuate with changes in time and environment.

This type of CNT network coating on the substrates in sensitive to environmental conditions including moisture and heat. Sheet resistance of a dried bare carbon nanotube coating on the substrates could decrease when first exposed to low moisture level, and then significantly increases at different moisture levels after reaching equilibrium. Sheet resistance also increased upon heating especially at high temperatures such as in the range of 125-400° C. The effects of both moisture and temperature are fully or partially reversible.

When flexible substrates such as plastic films are used, the resulting CNT network coating has very good flexibility. However, these coated substrates often do not have extremely high adhesion and abrasion resistance. Typical substrate types include glass, plastic, ceramic and similar materials.

Currently commercially available transparent conductive coatings and films made from ITO, conducting polymer, and nanocomposites containing nanotubes or other conductive particulates, suffer from at least one common characteristic.

All these coating and films are formed as a solid layer to which additional layers of materials can be applied above or below to provided further function or protection from environmental influence. For example, ITO is coated on a flexible transparent polymeric film and over coated with an abrasion resistant polymer such as an acrylic to protect the surface during handling in the factory or by the end user.

A disadvantage is that the acrylic top coating also serves to electrically insulate the coated surface, making contact to the conductive ITO difficult or impossible. Since most commercially available transparent conductive coatings and films are solid materials, the addition of other layers typically interferes with this function of surface conductivity. In the case where composite layers are formed comprising a polymer and a conductive constituent, the polymer in the composite can be selected to provide additional functions such as abrasion, humidity, temperature, adhesion and maintain the conductive properties of the layer. This approach is used commercially to form transparent conductive coatings with PEDOT and polymeric resins to form a solid layer. The disadvantage to this approach is that in these composite coatings, conductivity is greatly reduced by the presence of polymeric resins which serve to dilute and interrupt the conductive pathways.

SUMMARY OF THE INVENTION

The present invention overcomes the problems and disadvantages associated with current strategies and designs and provides new tools and methods for providing carbon nanotube coated substrates.

One embodiment of the invention is directed to a conductive coating or film comprised of carbon nanotubes and a fluoromonomer or fluoropolymer binder. Carbon nanotubes are preferably less than 3.5 nm in diameter, and more preferably, single-walled carbon nanotubes. Fluoromonomer and fluoropolymer binders that are useful in the invention include crystalline and semicrystalline fluoromonomers and fluoropolymers, amorphous fluoromonomers and fluoropolymers, fluoroplastics, fluoroelastomers, fluoroacrylates, fluorourethanes, terfluoromonomers and terfluoropolymers, perfluoro carbon-based monomers and polymers, fluoro-containing thermoplastics, thermosets and elastomers, blends of one or more different fluoromonomers and fluoropolymers, and combinations thereof.

Another embodiment of the invention is directed to conductive coatings films of the invention that are optically transparent. Preferably, these coatings or films have a transmittance value to light at 550 nm of greater than 65%, and more preferably greater than 90%. Preferably, these coatings or films have a transmittance value to light at 550 nm of greater than the corresponding transmittance value of the coating or film without said binder. Also, these coatings or films preferably have a transmittance value of up to 5% greater than the corresponding transmittance value of the coating or film without said binder.

Another embodiment of the invention is directed to conductive coatings films of the invention that have a sheet resistance of from $10^{-1}$ to $10^4$ $\Omega/\epsilon$, more preferably from $10^1$ to $10^3$ $\Omega/\epsilon$, preferably up to 10% less than the corresponding sheet resistance of the coating or film without said binder, and more preferably up to 50% less than the corresponding sheet resistance of the coating or film without said binder.

Another embodiment of the invention is directed to conductive coatings films of the invention that have a fluoropolymer binder containing an additive, preferably wherein the additive is selected from the group consisting of silanes, fluorosilanes, siloxanes, and metal alkoxides, and combinations thereof.

Another embodiment of the invention is directed to a method of forming a conductive coating or film comprising applying to a substrate a layer of carbon nanotubes and a layer of a fluoropolymer, preferably wherein the coating or film is optically transparent. Preferably, wherein the coating or film has a transmittance value to light at 550 nm of greater than 65%, more preferably, greater than 90%, and also preferably the transmittance value to light at 550 nm is greater than the corresponding transmittance value of the coating or film without said binder, preferably at least 5%, and more preferably at least 50% greater than the corresponding transmittance value of the coating or film without said binder.

Another embodiment of the invention is directed to a method of increasing the conductivity of a conductive film comprising applying a layer of carbon nanotubes to a surface to form a conductive film; applying another layer of material to said carbon nanotube layer that compresses said carbon nanotubes and increases sheet conductivity across a surface of said conductive film, preferably wherein the another layer contains a fluoropolymer or fluoromonomer binder.

Other embodiments and advantages of the invention are set forth in part in the description, which follows, and in part, may be obvious from this description, or may be learned from the practice of the invention.

DESCRIPTION OF INVENTION

Figure 1:
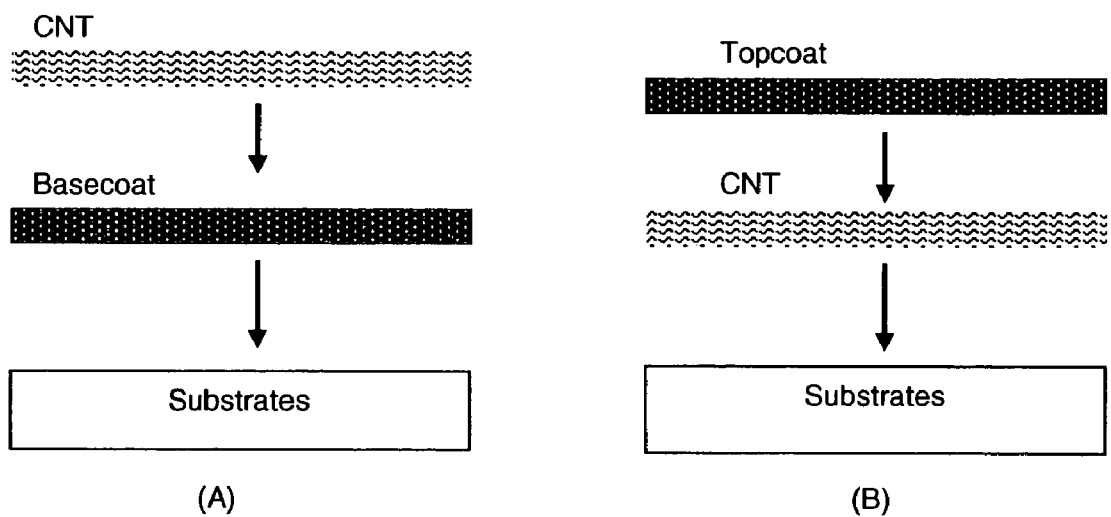
FIG. 1. Different coating layer structures by using carbon nanotubes and binders wherein (A) CNT are above the basecoat, (B) below the topcoat, and (C) between the basecoat and topcoat.
Figure 1:
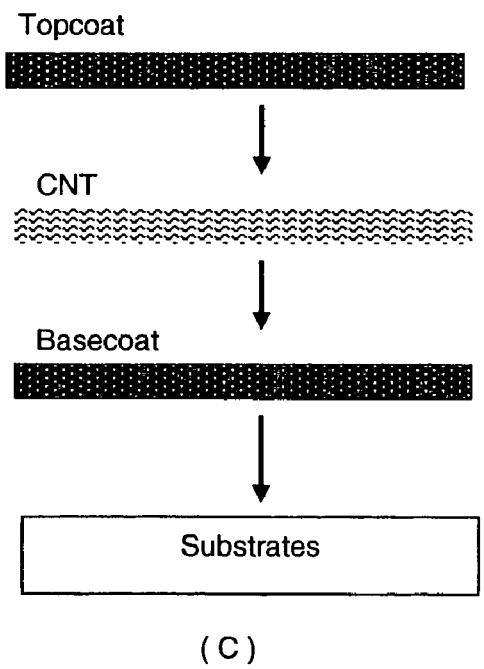

Most commercially available transparent conductive coatings and films are solid materials. Additional layers are often necessary to protect the layer and provide resistance to environmental conditions such as abrasion, moisture and thermal (heat and cold) resistance. The addition of other these other layers often interferes with surface conductivity. This has been considered an acceptable and expected trade-off in production. For many polymer binders, there is an increase in sheet resistance (Rs), a decrease in transparency and/or haze (depending on polymer type and in part, due to refractive index matching), and a hostility and incompatibility of the solvents for these binders with sensitive substrates such as acrylic and polycarbonate.

It has been surprisingly discovered that conductivity of conductive coatings and films can be maintained and even increased by applying a binder layer. Suitable binder layers comprise chemicals that have a low index of refraction or low dielectric constant, and which may also be water resistant. Such chemicals include halogen containing polymers such as, but not limited to, chloromonomers and chloropolymers, and fluoromonomers and fluoropolymers. Of even greater surprise was the discovery that such binders result in a CNT composite with increased conductivity and also correspondingly decreased resistivity. In particular, the invention is directed to optically clear substrates such as, but not limited to, PET and glass, containing conductive coatings of carbon nanotubes. The invention is also directed to methods of forming substrates of the invention with highly conductive CNT coatings that are useful for display and electronic applications.

Substrates of the invention contain a layer of CNT, which are typically highly purified, applied to a substrate through, preferably, spraying or dip coating. This forms a nanometer level thick transparent conductive coating. Preferred thicknesses range from 0.5 to 5,000 nm, from 1 to 3,000 nm, from 5 to 2,000 nm, and from 2 to 500 nm, from 2 to 300 nm, from 1 to 200 nm, and from 1 to 100 nm. More preferable thicknesses ranges can be from 1 to 2,000 nm, from 2 to 1,000 nm, from 2 to 500 nm, and from 2 to 100 nm. Next, a polymer, also at nanometer thickness, is applied to this conductive coating. The thickness of the polymer coating is often greater than the CNT coating, but not necessarily. Polymer coatings can be the same or have a higher or lower thickness than the CNT coatings. Polymer coatings are typically from 0.5 to 5,000 nm, from 1 to 4,000 nm, from 2 to 1,000 nm, from 1 to 500 nm and from 1 to 100 nm. These coatings are preferably applied by dip or spraying coating to provide protection to the conductive layer. A variety of polymers including non-fluoropolymer and fluoropolymers are suitable for this function.

This invention also provides binders combined with CNT/substrate with significant improvement in transparency and either no change or an improvement in surface conductivity (with a corresponding decrease in Rs). These binders further improve properties including resistance to moisture, temperature, abrasion and bending. As additional benefits, the solvents used are also compatible with sensitive substrates such as polycarbonate and acrylic (e.g. PMMA).

One embodiment of the invention is directed to methods of forming CNT coating materials with binders, and in particular, fluoropolymer binders. The use of binders with CNTs is advantageous at least because:

1. CNTs such as SWCNT that applied to a substrate are fixed into position maintaining or improving most of or all of the electrical properties, optical transmission and reduction of haze of the applied film. Sheet resistance is at least maintained (i.e. does not change as compared to without binder).

2. CNT's when applied with a binder do not loose contact with each other over time (which varies greatly depending on the substrate and use of the materials). A loss of contact causes permanent degradation in sheet resistance, which is entirely avoided or at least the life of the material extended by having the binder fixes the position of the CNTs thereby maintaining electrical properties.

3. The binder serves as a top coating, thereby protecting the material against environmental forces. Further, this top coating can be thin, unlike conventional overcoating which typically requires thicker coatings to achieve the same degree of protection.

4. CNT's can be applied in a fashion that allows the tubes to rope together, which is believed to be an important feature for maintaining conductivity. The binder stabilizes the self-assembled network of CNTs preventing unraveling of the network.

5. Once the binder has stabilized the network of CNTs, additional over coating can be applied to further safeguard the CNT and/or the materials from environmental forces.

A fluoropolymer containing binder, which is a solution of one fluoropolymer or a blend of fluoropolymers, which may be formulated with additives, is applied onto carbon nanotube-based transparent conductive coating on a clear substrate such as PET and glass. Both the binder and CNT coatings are at a nanometer level of thickness (for example but not limited to 10-200 nm) with interpenetration to each other. The fluoropolymers or blend can be either semi-crystalline (with low level of crystallinity) or amorphous, preferably to be amorphous with low refraction of index. This binder topcoat significantly improves optical transparency (and reduces haze), as compared to CNT coatings without binder (preferably by 5%, by 10%, by 15%, by 20%, by 25%, by 35%, by 40%, by 50%, and more preferably by up to 75% or more), and also CNT coatings with conventional binders, and also keeps or even increases conductivity of the CNT based coating. As an additional benefit, the solvents used are also compatible with sensitive substrates such as polycarbonate and acrylic (e.g. PMMA). This binder coating and the resulting products are used for display and electronic applications.

This invention is also directed to approaches to protect CNT-based, and preferably SWNT-based, transparent conductive coatings by selectively utilizing polymer binders. When SWNT is first applied onto a substrate, a conductive CNT network coating having an open structure (open volume approximately 40-60%) is formed. The polymer binder subsequently applied provides protection by infiltration into the CNT network. Without significant decrease in optical transparency and surface conductivity, the polymer binders provide the resulting products with good stability upon exposure to harsh environments such as moisture and high temperature. In addition, binders may also increase optical transmission, reduce haze, increase conductivity, and provide excellent flexibility, adhesion and abrasion resistances. Such binders include, but are not limited to polyesters, polyurethanes, polyolefins, fluoroplastics and fluoroelastomers, thermoplastic elastomers, polyvinylidene fluoride (PVDF), polyvinyl fluoride (PVF), polychlorotrifluoroethylene (PCTFE), polyvinylalkyl vinyl ether, acrylates, epoxies, melamines, silicones, organosilicon polymers, fluorosilicones, and other similar copolymer or hybrid polymeric materials, and combinations thereof. This invention also provides combinations of a CNT coating as primary conductor layer and a conductive polymer as the binder to have transparent and electrically conductive coating and film products. The CNT and polymer binder coatings can be fabricated as layered structures.

Another embodiment of the invention is directed to flexible, transparent and conductive coatings and films comprising carbon nanotubes and polymer binders, and the corresponding fabrication methods, coating layer structures, processes and resulting articles. Selective utilization of polymer binders and coating layer structures gives protection of the CNT coating by infiltration into the CNT network from environmental and mechanical conditions. Such conditions include, but are not limited to, moisture, heat or cold (i.e. thermal), wear and abrasion.

Another embodiment of the invention is directed to single walled carbon nanotubes (SWNT) applied to transparent substrates to form one or multiple layers of coating at a nanometer level, with one or more polymer binders. The one or more polymer binders are selectively utilized to protect the CNT conductive layers. The polymers can be a thermoplastic or thermoset, or a combination thereof. In particular, the polymers are preferably hydrophobic for superior moisture resistance. High molecular weight thermoplastics and cross-linked thermosets for also preferred for increased abrasion resistance and heat stability, as compared to non-binder coatings. These binders are also chemically compatible with the CNT's and also each other, for good adhesion and durability, providing for excellent conductivity on the surface. Combinations of these binders, imparting their respective properties to the material is also preferred.

Polymers can be in a single layer as either a basecoat underneath the nanotube coating, or a topcoat above the nanotube coating, or a combination of both. Binders can be formed in two or more layers in the basecoat, the topcoat or both, forming a sandwich structure. This embeds the nanotube coating in the middle, which provides good interpenetration and interfacial bonding. The CNT conductive coating layers and the binder layers number from single to multiple can be in any suitable combinations. The definition of a layer, for purposes of the invention, is not limited to the conventional meaning of a layer as a separate, independent material. For purposes of the invention, layers of polymer binder can also be considered to infiltrate into the CNT network coating. However, in another sense, the layer is considered a traditional layer in that it sits upon and flattens the CNTs. Without limiting the invention to a theory, it is believed that this flattening or compression of the CNT layer results in an increased electrically conductivity and/or decreased electrical resistance, as compared to coatings or films without binder (or at least maintaining the same resistance and/or conductivity). Preferred decreases in sheet resistances are from 5% to 80%, from 10% to 70%, from 15% to 50%, or more preferably from 10% to 50. Also preferred is maintaining the same sheet resistance. It is believed that no such observation has previously been described for CNT materials.

Another embodiment of the invention is directed to layers of the invention that are further modified by surface modification either chemically or physically, such as by, although not limited to, deposition of inorganic polymeric materials such as, for example, silane and metal alkoxides, silicones, polysilanes, polysilazanes, polygermanes, polystannanes, polyphospahazenes. The resulting coatings, films and other forms, also have good flexibility, can be used, for example, for flat panel display, touch screen, OLED, MEMS and many other electronic applications.

Figure 5:
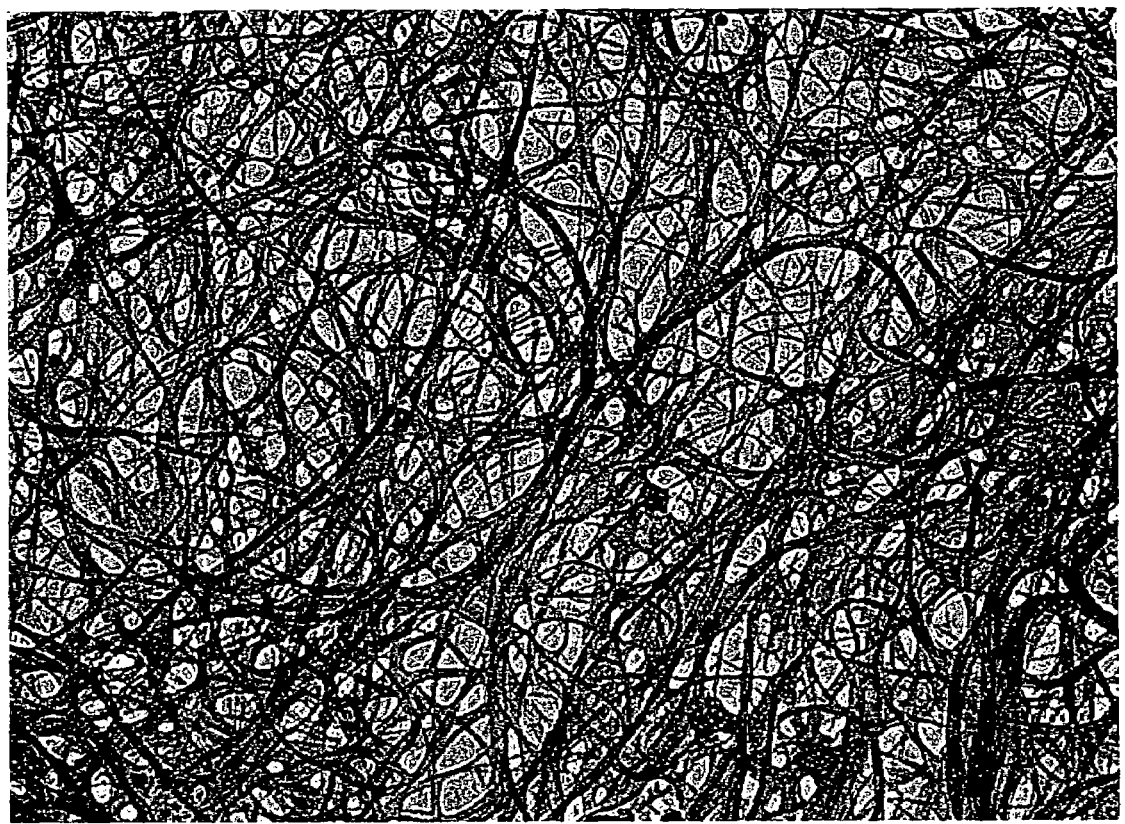
FIG. 5. TEM image of nanotube coating showing open space between ropes of nanotubes.
Figure 6:
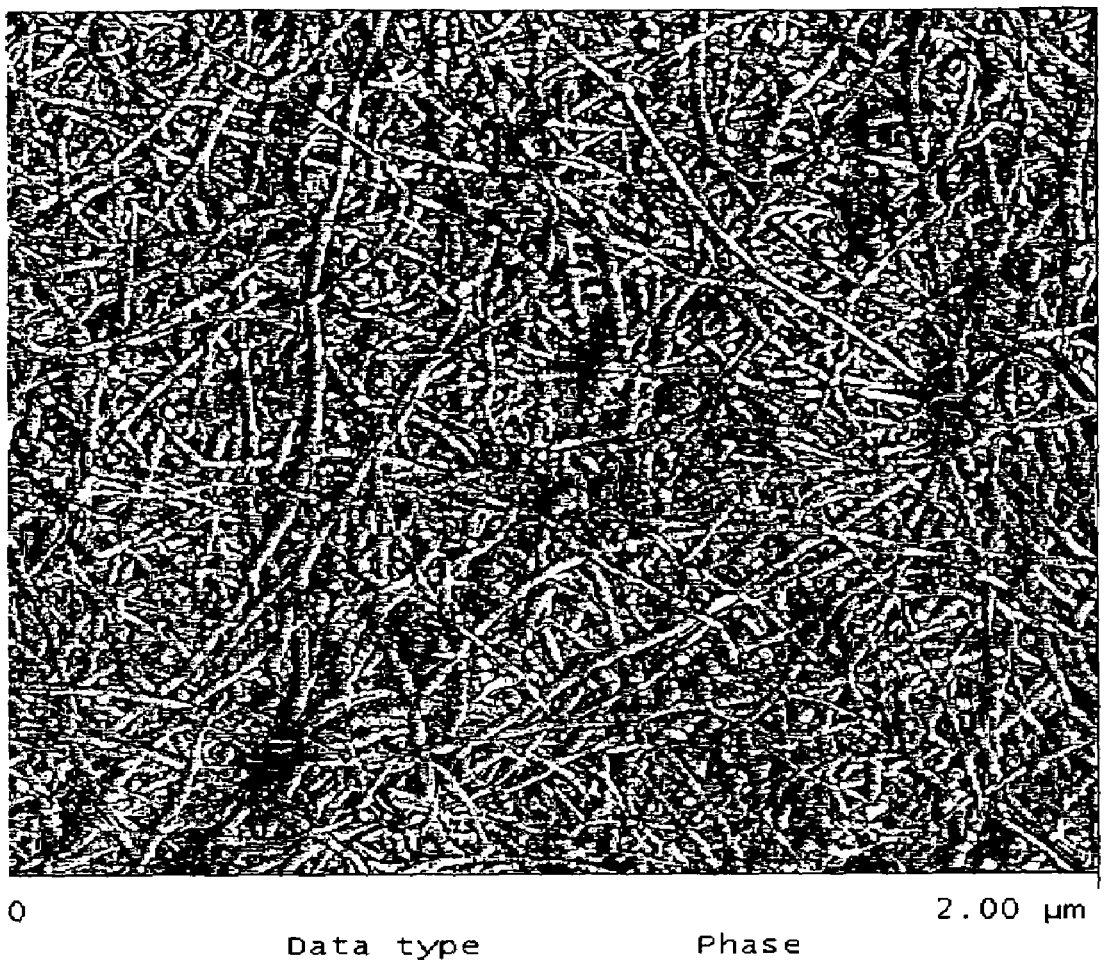
FIG. 6. SPM Image of single-walled nanotube coating with 500 $\Omega/\epsilon$ resistivity.
Figure 7:
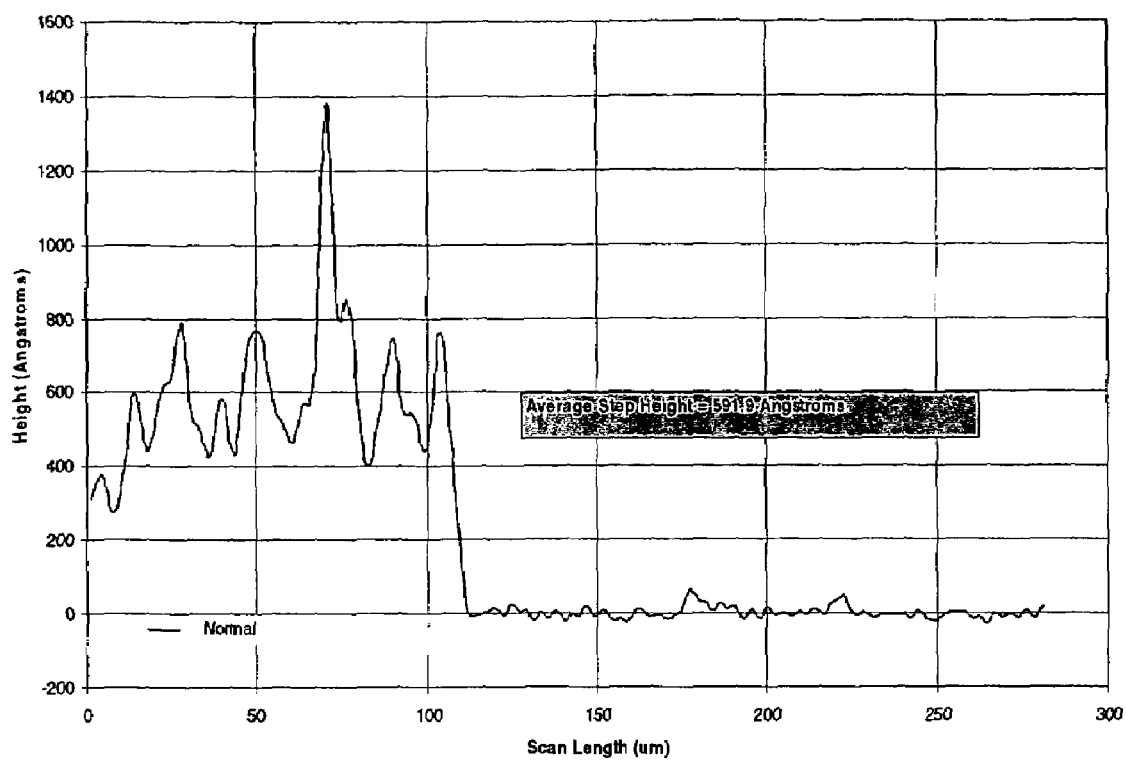
FIG. 7. Profilometry of CNT coating thickness on glass substrate.

Another embodiment of the invention is directed to conductive networks of CNT formed with binder materials. This approach allows the formation of multilayer coating consisting of several binder materials that do not necessarily cover the conductive CNT layer. The binder coating is added to the CNT network to partially (e.g. less than 90%, less than 80%, less than 70%, less than 60%, less than 50%, less than 40%, less than 30%, less than 20%, less than 20%, less than 10%, less than 1%, and ranges defined by any of the preceding), or completely fill the open spaces between the porous CNT network and can be coated thick enough to completely cover the CNT layer. An additional benefit to this approach is that the top coating/binder not only penetrates the CNT layer, but also passes through the CNT layer down to the supporting substrate where the binder adheres or reacts to bond the materials and layer together. This resulting composite structure is not possible by conventional means for forming transparent conductive coatings and films. In addition the application of a binder to the CNT network layer can be done such that only a small fraction of the available free space between the CNT network is filled, thereby leaving room for additional resins, reactants, gases to interface/interact with the CNT network (see FIGS. 5 and 6). This approach allows for the same CNT layer to be useful in a variety of applications by selecting binder materials which add additional functional characteristics.

The polymer binder is applied using dilute solutions (e.g. less than 5%, less than 4%, less than 3%, less than 2%, less than 1%, and ranges defined by the preceding, more preferably from 0.1%-1%, more preferably from 0.5%-1%, and even more preferably from 0.01%-0.1%) of polymer in solvents. This allows the deposition of thin coatings (e.g. less than 0.2 micron) on the nanotube network. This is believed to be novel because traditionally top coatings applied to plastic or glass substrate are deposited much thicker (e.g. from 1-5 microns) to protect the substrate from abrasion, moisture, thermal degradation, and other environmental damage. In the present invention, a thin binder coating of the same materials provide protection to the transparent conductive layer comprising nanotubes. The coating can be deposited using conventional coating process such as dip, flow, spin, gravure, roll, or spray, or any others known to those skilled in the art.

Another surprising and unexpected result of the invention is that such thin coatings are effective at providing environmental protection commonly requiring much thicker coatings. The protection provided by the very thin coating on the nanotubes is at least partly attributed to nanoscopic scale of the composite which is formed.

One example of usefulness of the present invention is in touch screen displays wherein the touch sensitive switch is formed from two layers of transparent conductive materials separated by air and spacers. Typically, a resistive touch screen employs ITO deposited on glass to form one electrode and also has a second electrode made from ITO deposited on PET polymer film placed on top of the ITO/glass layers. When a finger or other object touches the structure, the two layers contact sending a signal and thereby allowing the position of the finger to be sensed. Frequent use of the ITO layer in this manner renders the layers prone to cracking and failure. According the present invention, a binder material is added that provides a more durable, long-lasting coating which is bonded to the polymer or glass substrate to prevent failure. Conventional ITO cannot be modified in this way especially when dispersed in a binder material and coated. The resulting ITO composite would not have the same electrical and optical performance characteristics as that of the solid layer of ITO.

This present invention is also useful as a direct replacement in all applications where ITO is used as a transparent conductive coating or electrode in products, such as, but not limited to, touch screens; LCD, plasma and OLED displays; ESD coatings, EMI shielding coatings; windows and lenses; electrochromic, electroluminescent and field emission displays, heat reflective coatings, energy efficient windows, gas sensors, and photovoltaics.

1. Material Types and Combinations

Selective utilization of polymer binder types and coating layer structures provides protection to CNT-based transparent conductive coating. Transparent and conductive coatings in this invention can be made at least using the following combinations of materials, coating layer structures, fabrication methods and processes. The selection and combinations of these parameters deliver the products that meet desired performance criteria after addition of topcoat including higher conductivity (e.g. decrease in sheet resistivity by 10-70%), optical transparency (e.g. greater than 60% T, greater than 70% T, greater than 80% T, and more preferably greater than 90% T), haze reduction (preferably more than 1%, more than 5%, more than 10%, more than 15%, more than 20%, and more preferably up to 50%), flexibility (e.g. withstanding cycle testing until cracking at about 27,000 cycles, and more preferably cycle testing until cracking at about 32,000 cycles or up to 20% after folding test), abrasion resistance (increase by up to 33,600% measured by change in Rs after abrasion for 60 cycles), adhesion (e.g. up to 5,000% increase measured in change in Rs after peeling using scotch tape for 4 times), environmental such as moisture resistance (e.g. 40-100%, 50-100% and more preferably 60-100% measured increase change in Rs from dry to RH 75% after stabilized for 24 hrs), temperature resistance (e.g. up to 90% change measured by change in Rs after 125° C./2 hrs and then room temperature for 16 hours), and long-term durability.

Carbon nanotubes are applied onto transparent substrates to form one or multiple primary conductive layers. Polymers can be used as binders (and potentially secondary conductors in case of conductive polymers) in a coating layer structure to deliver products having good mechanical, thermal and/or electrical properties, as desired.

1.1. Carbon Nanotubes

Highly pure carbon nanotubes and bundles are preferred. Single-wall or dual-wall carbon nanotubes are also preferred for high conductivity. Perfect and pure single walled carbon nanotubes (SWNT) having high content of metallic nanotubes are more preferable. Average outer diameter of the carbon nanotubes is generally 3.5 nm or less. Such CNT's are generally made by the method of arc-discharge, chemical vapor deposition, or laser ablation followed by purification, although other productions methods are known and available. Purification methods include acid treatment followed by extraction, field flow fractionation (FFF), thermal oxidation, centrifugation, and any other standard or conventional methods.

Purified carbon nanotubes are generally dispersed into the organic solvents such as mixture of water and alcohol, or another solvent. The CNT's are applied onto the substrate, for example, by spraying coating, dipping coating, spinning coating, and other deposition methods in wet or dry states.

The coating thickness of the CNT network coating is preferably in the range of about 10 to 1,000 nm, depending on the sheet resistance value desired. Preferred ranges are 10 to 500 nm for sheet resistance range of $10^{-1}$-$10^5$ O/$\in$.

1.2. Transparent Substrates

Transparent substrates are primarily polymer films and glasses. These include but are not limited to polyester, polycarbonate, polyolefins, polyurethanes, acrylates, epoxies, fluorocarbon elastomers, plastics, other similar types of polymers, and combinations of any. Thermoplastics such as polyethylene tetraphthalate (PET) and polyethylene naphthalate (PEN) are preferred for products used for display applications. Such products include Melinex (PET manufactured by Dupont-Teijin), Lumirror (PET manufactured by Toray) and Teonex (PEN manufactured by Dupont-Teijin). The transmittance value of the films at wavelength of 550 nm is in the range of 60-99% transmittance, preferably from 75-95% and more preferred, greater than 90% transmittance. Glass substrates include regular and optical display grades of glass such as Corning 1737 and Corning Eagle 2000™. Corresponding transmittance at 550 nm is generally higher than 90% (more preferably greater than or equal to 91%).

1.3. Polymer Binders

Selective utilization of polymer binders. The polymer binders include, but are not limited to, polymers that are thermoplastics or thermosets, or any combination of one or more types of either or both.

Polymer binders are applied by dip coating in the form of dilute solution, chemical deposition in the vapor state, sputtering in solid state, or by another conventional method. Dip coating is one of the preferred methods in which the polymer solution concentration is generally in the range of 0.01-5% (more preferably in the range of 0.1-1%) to achieve desired coating thickness. The polymer is dissolved in organic solvents having low boiling point. Such solvents include, but are not limited to acetone, toluene, methyl ethyl ketone (MEK), water, other similar chemicals or mixtures, and any combination thereof. Solvents are dried off after coating.

Thermoplastic polymers include, but are not limited to polyesters, polyurethanes, polyolefins, chloro- or fluoroplastics and chloro- or fluoroelastomers, thermoplastic elastomers, similar chemicals and any combination thereof. Fluorine-containing polymers include, but are not limited to polyvinylidene fluoride (PVDF), polyvinyl fluoride (PVF), polychlorotrifluoroethylene (PCTFE), polyvinylalkyl vinyl ether, any copolymers or polymer mixtures. Thermoplastics may be directly applied to form coating through drying process.

Thermosetting polymers of the invention include, but are not limited to cross-linked polyesters, polyurethanes, acrylates, epoxies, melamines, silicones, organosilicon polymers, fluorosilicones, and other similar copolymer or hybrid polymeric materials, and combinations thereof. Corresponding thermoplastic precursors can be applied onto the substrate followed by drying and cross-linking reaction (such as curing). Substrates can be cured through heating, moisture, visible light, UV or other irradiation, or with combined curing processes. Binders can also be applied and the materials partially or fully cured in the course of fabrication, and fully cured in the end of processes. The partially cured or "B-staged" prepolymers provide advantages in processing because the CNT conductive layer can be pressed into the binders while maintaining high conductivity.

Polymer binders useful with UV or irradiation curing are acrylates polymerized through free-radical mechanism, epoxy cured through cationic polymerization, or similar materials using curing mechanism such as thio-vinly reaction chemistries. The materials without oxygen inhibition are preferred for easy processing in air.

It is preferred that these polymers have the following options and/or combinations:

In one preferred embodiment, polymers have medium or high hydrophobicity in chemical nature for high moisture resistance. These regular and fluoro-containing thermoplastics, thermosets and elastomers are described herein. One example of regular polymer is polyester solution LCC-4 (available from Flexcon) dissolved in the mixture of acetone and toluene. One example of fluoropolymer is PVDF (Hylar SN manufactured by Solvay) dissolved in, for example, N,N-dimethylacetamide or acetone.

Fluoropolymers are formed in a solution of one polymer or a blend or formulation of several fluoropolymer components, which are amorphous or partially crystalline. Amorphous fluoropolymers such as Teflon AF are preferred. These polymers have very good optical transparency with low refraction of index, in combination with excellent chemical resistance and thermal resistance. Their solutions in fluorosolvents can be used for dip or spraying coating onto CNT based transparent conductive coating on substrates such as, for example, PET, PEN, polycarbonate, acrylic and glass.

Fluoropolymers include, but are not limited to amorphous perfluorocarbon-based polymers. The amorphous fluoropolymers are known as fluorinated carbon-based backbone having ring structure or bulk group as side chains. It is generally a copolymer of TFE (tetrafluroethylene) and other fluorinated monomers. Typical examples include:

co-polymers of tetrafluoroethylene (THE) with 2,2-bistrifluoromethyl-4,5-difluoro-1,3-dioxole (PDD), available from Dupont as Teflon AF, having refraction index in the range of 1.29-1.30 depending on ratio of THE/PDD. Grade 1600 and 2400 are commercially available and can be dissolved in fluorine containing solvents such as Fluorinert FC 75 and FC40;

Cytop™ from Asahi Glass Company having refraction index of 1.34, which is amorphous fluoropolymers and also dissolvable in perfluorosolvent; and FluoroPel PFC series (from Cytonix) including PFC 501A, 502A, 504A, 501AFA, 501AFA, 504AFA, PFC 601A, 602A and 604A, etc. Refraction index of this type of amorphous fluoropolymer is 1.32. They are generally dissolved in fluorosolvents such as 3 M HFE 7100 and like chemicals.

Also useful with the invention are partially crystalline fluorocarbon polymers. Many of these chemicals are fluorocarbon-based fluoroplastics and fluoroelastomers, which are generally copolymer or terpolymers of TFE and other monomers such as perfluoro vinyether. These polymers are commercially available from Dupont, Dupont Dow Elastomers, 3M, Ausimont, Solvay, Daikin, Asahi Glass. Examples include: Terpolymer of tetrafluoroethylene (TFE), hexafluoropropylene (HFP) and vinylidiene fluoride (VDF) such as THV-200, available from 3M, which is dissolvable in regular organic solvents such as ethyl acetate and ketones. It has excellent optical transparency and low refraction index.

Other fluoropolymers include, but are not limited to fluoroplastics and fluoroelastomers such as, but not limited to: fluoroacrylate, fluorourethane, perfluoroether; and similar chemicals.

Blends of fluoropolymers are also useful with the present invention. These blends include, but are not limited to, blends of amorphous and semi-crystalline fluoropolymer (e.g. fluoroelastomers); blend of fluorocarbon polymers and any other fluoropolymers such as fluoroacrylates, fluorourethane and perfluoroether, and similar chemicals, blend of combination of fluoroacrylates, fluorourethane and perfluoroether, and other similar chemicals.

Suitable fluoropolymer or blends can be dissolved in regular organic solvents or fluorosolvent for solution dip coating or spray coating. One example of fluorosolvent is perfluoro(2-n-butyl tetrahydrofuran) available from 3M as Fluorinert FC-75. They may have low boiling points from 50-150° C. The fluoropolymers can be formulated with addition of other ingredients such as fluorosilanes to improve adhesion. Other additives can be included for desired properties.

In another preferred embodiment, polymers are thermoplastics having high molecular weight or thermosets having cross-linking structures for high thermal and mechanical durability. The thermosetting polymers are used to bond nanotubes together nanomechanically to improve conductivity stability under heating. Another advantage of this approach is to increase abrasion resistance. One example of thermoplastic polymer is the polyester solution LCC-4 (Flexcon) dissolved in the mixture of acetone and toluene. The thermosetting polymers can be melamine/acrylic copolymers, UV curable epoxy or other systems.

In another preferred embodiment, polymers can be conductive polymers including (but not limited to) polythiophenes, polyanilines and their derivatives with substitution groups. Small amount of conductive polymers are only used to fill the gap space between CNT ropes to have good surface conductivity. Excess amount of these conductive polymer binders will decrease optical transparency of the CNT network coating.

In another preferred embodiment, polymers can be chemically compatible with nanotube and the substrates to display good interfacial bonding and adhesion.

In another preferred embodiment, surface treatment with inorganic-organic hybrid compound forms interfacial bonding or binders. These include silanes, fluorosilane, metal alkoxides, and other related materials.

In the invention, these polymers are selected from any preferred embodiment, or any combination of these preferred selections to achieve desired property combination.

The binder coating thickness is preferably in the range of 10 to 1,000 nm depending on sheet resistance value required. A more preferred rage is 10 to 500 nm for sheet resistance range of $10^{-1}$ to $10^6$ O/€ (also $10^1$ to $10^3$ O/€, $10^0$ to $10^4$ O/€, $10^{-1}$ to $10^5$ O/€). This binder layer diffuses into the CNT network or mat and provide protection from mechanical damage and moisture infiltration while also exposed some CNT on the surface for conductivity. Coating thickness can be controlled by the binder solution concentration and dip coating conditions such as speed and angles. Properties such as abrasion resistance and moisture resistance depending on coating thickness can be further optimized by these parameters.

In another preferred embodiment, fluoropolymers are used as binder coating for CNT on sensitive substrates such as PMMA and polycarbonate (sensitive to regular solvents). Sensitive substrates have a limited selection of regular binders and solvents for coating. Since perfluorosolvents used in this invention may be inert to these sensitive substrates, the invention provides a new approach to coated CNT transparent conductive coating on the sensitive substrates.

In another preferred embodiment, amorphous fluoropolymer is used to coat CNT transparent conductive coating for its extremely good abrasion resistance, which is much better than that of other polymer binders.

In another preferred embodiment, fluoropolymer coated CNT coating is thermally treated because treatment can enhance properties such as interfacial adhesion and chemical resistance.

In another preferred embodiment, fluoropolymers can be formulated with fluorosilanes and other ingredient to further improve adhesion. Fluoropolymers coated CNT coatings have surprisingly good adhesion on the substrates such as glass. Fluorosilane can be mono- or bifunctional silanes, which has fluorocarbon or perfluoroether-type of structures.

In another preferred embodiment, fluoropolymers can be used as a single layer only, or as dual or multiple coatings in the same film. For example, Teflon AF can be coated to glass substrate first. After heat treatment and cooling down, CNT can be coated onto the surface followed by another layer of Teflon AF, to form a type of sandwich structure.

In another preferred embodiment, fluorosolvents and fluoropolymers used may contain or dissolve a high percentage of oxygen, which is a dopant for semiconductive carbon nanotube. In addition, these chemicals can act as a solution to remove water trapped in the carbon nanotubes.

In another embodiment, since some substrates are sensitive to solvents and chemicals, fluoropolymers can be applied onto the substrate first to form a passivation layer before CNT coating.

Fluoropolymers disclosed in this invention may also be used to form CNT based conductive layer or a pattern which is highly hydrophobic.

The preferred embodiments may also be performed with the use of monomers as the binder coating to form CNT conductive layers.

2. Coating Layer Structures and Combinations

These preferred polymer binders, for example, can be combined with the nanotube coating in the following coating layer structures:

2.1. Basecoat

As shown in FIG. 1 (A), the selected polymer binder is applied onto the transparent substrates first, following by a layer of carbon nanotube network coating on the top. The nanotube coating is pressed into thermoplastic or partially cured ("B-staged") polymer binder layer. The "B-staged" polymer binders can be further cured to form cross-linked structure. Bare carbon nanotubes exposed to the outer surface ensure further electrical connection during service. High degree of penetration of CNT layer into the thermoplastic or "B-staged" thermoset binders is preferred.

2.2. Topcoat

As shown in FIG. 1(B), the selected polymer binder is applied after the CNT conductive coating has been coated onto the substrate. The thermoplastics can be directly applied while thermosetting polymers need to be cured afterwards. This binder layer is expected to diffuse into the CNT network or mat and provide protection from mechanical damage and moisture infiltration while also exposed some CNT on the surface for conductivity.

This coating structure with the topcoat only is preferred due to its better protection than that with the basecoat only. The topcoat is preferably water resistant to subsequent binding. Additives may be included before deposition or the surface of the binder layer be subsequently treated by, for example, heat treatment, plasma treatment, corona treatment, or a combination thereof.

2.3. Combination of Basecoat and Topcoat ("Sandwich Structure")

By using similar procedures described herein, the same or different polymers are applied as combinations of basecoat and topcoat as shown in FIG. 1(C). Thermoplastics and partially cured ("B-staged") thermosets are treated the same way as described herein.

This "sandwich structure" is also preferred for better protection and higher adhesion. In one most preferred embodiment, the basecoat is a partially cured "B-staged" binder followed by formation of CNT network coating. After the CNT network is pressed into the "B-staged" thermoset binder, the binder will be fully cured. The topcoat is formed through subsequent coating with a thermoplastic or thermoset binder. In this way the basecoat is protected from solvents during the late process. The resulting products have good mechanical properties and chemical resistance.

2.4. Combination of Multiple Layers

The combinations of basecoat, topcoat and surface treatment can vary in different layers ranging from single to multiple layers.

3. Process

This invention also provides all the related fabrication methods and processes using the related materials and coating layer structures as described.

4. Methods

This invention also provides all the related methods and resulting products in any form such as coating, film, articles and part of devices.

The resulting products have excellent optical transparency and high electrical conductivity. The conductivity can also be adjusted to in a broad range of sheet resistance. They also offer other advantages including neutral color tone, good adhesion, flexibility, abrasion resistance and environmental resistance (to heat and moisture). Therefore, these products can be used as transparent conductors in display applications.

The following examples demonstrate various, but not all embodiments of the invention, and should not be viewed as limiting the scope of the invention.

EXAMPLES

Basic Evaluation Methods

The examples disclosed herein follows the basic procedures and evaluation methods listed below.

CNT Coating

Carbon nanotubes are coated onto the substrates by spraying purified SWNT inks dispersed in IPA/$H_2O$ (3:1). The substrate is a glass slide (1×3" in size for testing), or PET film (typically Melinex ST505 in 6×8 cm size for testing). The both ends of the sample are coated with gold by sputtering, or with silver paste as the testing electrodes.

Polymer binding coating:

Polymer binders are dissolved in the corresponding solvents to make dilute solutions. The polymer binders are then applied onto the surface by dip coating manually or by automatically using machine. The samples are dried and cured subsequently. In some case (such as B-stage thermoset binder), CNT layer is pressed into the binder layer under a mechanical press with very flat surface (about 4,500 psi of pressure for 5-10 minutes) before full curing.

Binders

A polyester LCC-4 dissolved in the mixture of toluene and methyl ethyl ketone (MEK) (available from Flexcon);

a thermal curable melamine/acrylic polymer mixture LCC-5 dissolved in isopropyl alcohol (IPA) (available from Flexcon);

a thermal curable melamine/acrylic polymer mixture LCC-6 dissolved in isopropyl alcohol (IPA) (available from Flexcon) having higher hydrophobicity than LCC-5;

Polyvinylidene fluoride (PVDF) (Hylar SN from Solvay) dissolved in N,N-dimethyl acetamide;

A nitrocellulose/acrylic mixture ("NP resin" in short) diluted in ethyl acetate;

A UV curable epoxy UV 15 (from Master Bond) dissolved in methyl ethyl ketone (MEK);

Teflon AF (available from Dupont) dissolved in Fluorinet FC 75 (available from 3M);

SIFEL 611 (a thermal curable fluoropolymer available from Shin-Etsu) dissolved in the solvent X-70580 (available from Shin-Etsu);

An experimental nanosilicate compound is curable under heating through condensation reaction (available from Dupont) diluted in mixture of IPA/water.

Sheet Resistance (Rs) Testing

Sheet resistance (Rs in unit of O/∈) is measured by the well-known two-probe DMM method or four-point probe method. Preferred ranges are from $10^{-1}$ to $10^5$ O/∈, $10^0$ to $10^4$ O/∈, and $10^1$ to $10^3$ O/∈. Fluoropolymer added as a topcoat produced the surprising result of decreased resistance by a factor of between 10-20%, 10-30%, 10-40% and most preferably 10-50%.

Humidity Controlled Environments (Moisture Resistance)

Rs value is tested after exposure to different relative humidity (RH %) at the same ambient temperature for about 24 hours. The relative humidity (RH) level in the desiccator with drierite is expected to be zero. Different RH levels are controlled by different saturated solutions in a closed chamber (e.g., KOH, $K_2CO_3$, NaCl for RH 9, 43.1, 75.4%, respectively). Each Rs value measured after equilibrium at each RH level is then compared to the value at RH 0% by calculating the change percentage. In most of the situations, the change in stabilized Rs value from the dry state to that at RH 75% is used. Minimum change is preferred.

Thermal Resistance Evaluation

Thermal resistance of the samples in air is evaluated by a quick screening method. This method involves treatment at 125° C. for 2 hours in air following by cooling at the similar ambient conditions for at 16 hours. The change in Rs value compared to the initial Rs value in air is then calculated. Minimum change is preferred.

Abrasion Resistance and Flexibility

The sample surface is abraded by using a weight wrapped with cotton cloth for 60 cycles. Before and after the abrasion test, Rs value is tested and compared. For the sample size in 6×8 cm, a weight of 204 g is used while a weight of 100 g is used for the sample in 1×3" in size. Minimum change means high abrasion resistance.

For the samples on the polymer films, flexibility is evaluated by a folding test. Mechanical shock with a weight of 4 kg is applied onto the sample to fold the sample inward from the middle. Rs value is then tested and compared to the value before the folding test. Minimum change means high flexibility.

CNT/substrates without Binders

The sample of CNT network coating on glass or PET without any polymer binder is used as the control of benchmark for comparison.

Example 1

CE1: CNT/glass

The dispersion of SWNT in 3:1 IPA/water was sprayed onto a cleaned and dried glass slide (1×3"), which had been coated with gold by sputtering at both ends as the electrodes. This sample showed a stable Rs value of 667 O/∈ after being in the desiccator for 16-24 hrs. The transmittance of the CNT coating at wavelength of 550 nm is 90-91% % (which can be in the range of 92-95% when a better grade of ink is used). This number is used as the baseline value for further comparison. When this sample was exposed to relative humidity level of 9%, the Rs value initially quickly dropped to 580 Ω/∈ within 6 minutes and then quickly increased. After being stabilized, the Rs value of 688 Ω/∈ was observed. Compared to the baseline in dry (RH 0%) condition, the Rs value increased by 3.15% at this relative humidity level (RH 9%).

Similarly, the stable Rs values were 850 Ω/∈ and 1600 Ω/∈, corresponding to exposure to the humidity conditions of RH 43% and 75% for 24 hours, respectively. Compared to the baseline value at dry conditions, these corresponded to an increase by 27.4% and 88.8%, under the two conditions, respectively. The related data are also seen in Table 1 and FIG. 2.

This mean that sheet resistance Rs value of this CNT coating is sensitive to moisture. Rs significantly increases with relative humidity (RH %).

Another identical sample was evaluated for thermal resistance in air. Its initial Rs value in ambient conditions was 664 Ω/∈. Rs quickly increased by 150% (to 1659 Ω/∈) after 125° C./2 hrs and then decreased and leveled off when exposed to the same ambient conditions again. After cooling for 16 hrs, Rs (1102 Ω/∈) was 66% higher than the original. The data can be also seen in Table 1 and FIG. 3.

This means that sheet resistance value of CNT network coating on glass is sensitive to high temperature. Further experiments in dry nitrogen or argon also confirmed the observation. The thermal effect at low temperature ranges (<100° C.) is fully reversible. The change at higher temperatures is only partially reversible.

Another typical sample of CNT/glass was evaluated for adhesion and abrasion resistance. After the sample was peeled using Scotch tape for four times, the Rs was also increased by 4.1 times (Table 1). When the sample was abraded for 60 cycles, its Rs value increased by 336 times (Table 1).

Example 2

CE2: CNT/PET

The dispersion of SWNT in 3:1 IPA/water was sprayed onto a PET film (Melinex ST 505 from Dupont-Teijin). The sample was then cut into 6×8 cm in size with the both ends pasted with conductive silver paste for further testing. Typical Rs value was in the range of 500-600 Ω/∈ while optical transmittance value of this CNT network coating at 550 nm was 89-90% (which was in the range of 91-94% when a better grade of CNT ink was used). Results using similar screening methods are shown in Table 1.

CNT/substrate with Polymer Binders

Example 3

WE 1: CNT/glass with PVDF as the Binder (Topcoat)

Figure 2:
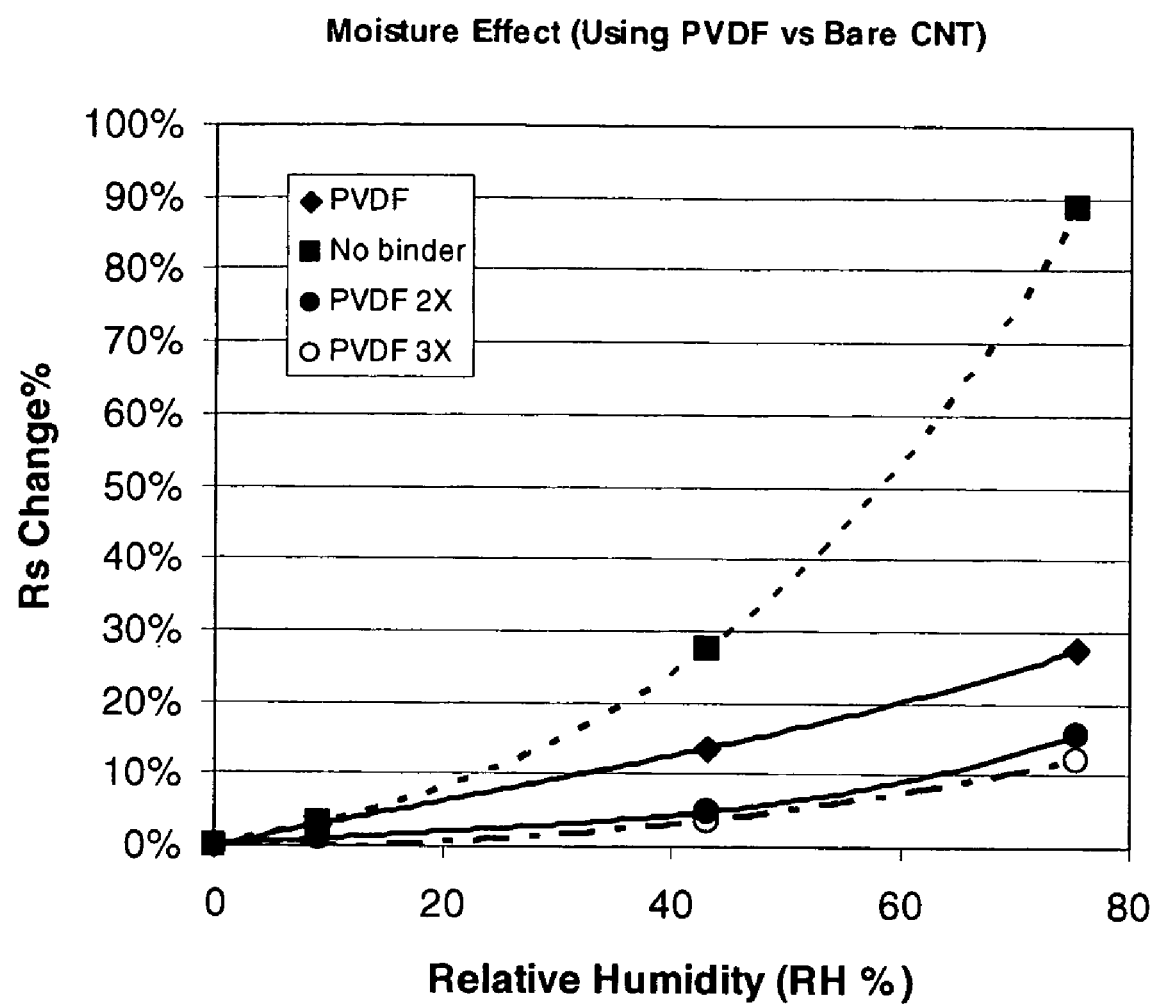
FIG. 2. Moisture Resistance of CNT network coating on glass with or without PVDF binder.
Figure 3:
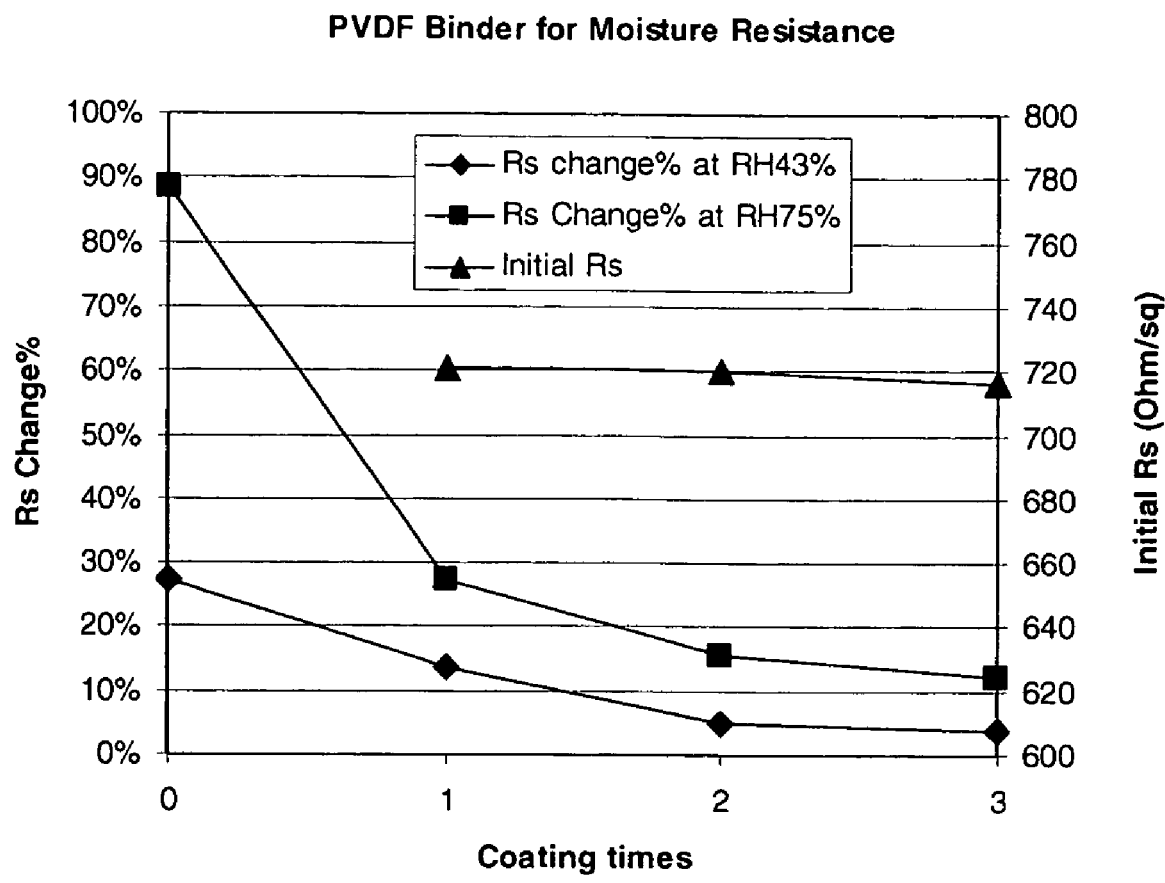
FIG. 3. Effect of PVDF coating times on moisture resistance.

By using the same ink used for the comparative examples, the sample of CNT/glass were made. It was then dip-coated with 1% of polyvinylidiene fluoride (PVDF) solution dissolved in N,N-dimethyl acetamide followed by drying, and then tested for moisture resistance in the same way as described. The sample was also coated with PVDF multiple times for better coating quality and higher thickness. The sample was tested each time after coating. The results are shown in FIG. 2, FIG. 3 and Table 2.

Initially the sample showed Rs of 630 Ω/∈ at ambient conditions. Stable Rs values of the sample with 1×PVDF coating are 720 and 919 Ω/∈, corresponding to RH 0 and 75%, respectively. The change in Rs from the dry state to RH 75% is 27.5%. After twice (2×) coating, stable Rs values are 720 and 833 Ω/∈, corresponding to RH 0 and 75%, respectively. The change from the dry state to RH 75% is 15.7%. After coating 3×, stable Rs values are 716 and 804 Ω/∈, corresponding to RH 0 and 75%, respectively. The change percentage decreases to be 12%. As shown in FIG. 2, the change percentage data are compared to the comparative example (CNT/glass without binder).

PVDF as a type of thermoplastic fluoropolymer improves moisture resistance significantly. With multiple-time coating, moisture resistance is further increased but this improvement tends to level off after 3× coating (FIG. 2 and FIG. 3).

Figure 4:
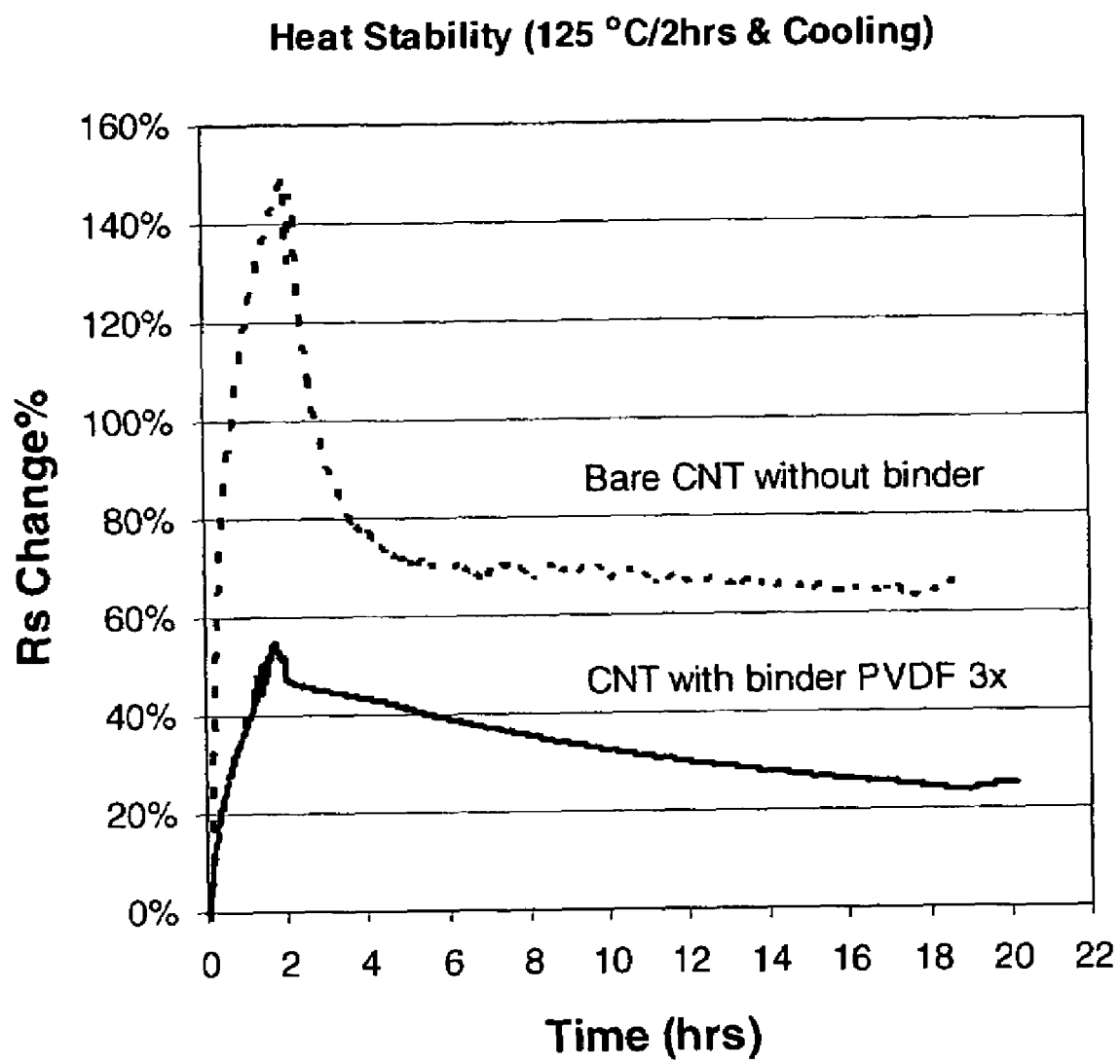
FIG. 4. Improvement of thermal resistance by using PVDF binders.

An identical sample of the working example #WE was evaluated for thermal resistance after triple coating with PVDF binder. As shown in FIG. 4, Rs increased by 41% after 125° C./2 hrs. After cooling for 16 hrs, the value was 25% higher than the original. After preheat treatment, these samples showed insignificant change in Rs when tested again at 125° C. Compared to the comparative example (#CE 1), PVDF as binder can significantly increase thermal resistance.

Example 4

WE 2-5: CNT/glass with More Binders (Topcoat)

Other working examples on glass substrate (#WE 2-5) are shown in Table 2 and Table 3. It can be seen that the polymer binders especially the polymer having higher hydrophobicity (e.g., fluoropolymers) give high moisture resistance to the transparent CNT network coating. The thermal resistance can be significantly improved by using polymer binders especially high temperature polymers and cross-linked polymer systems. The abrasion resistance is also significantly improved.

Example 5

WE 6-7: CNT/PET with Topcoat Binders

Example #WE 6-7 in the Table 4 illustrate using polyester and PVDF as top coat binder for the CNT based transparent conductive coating. After binder coating especially after coating for multiple times, all the performance parameters have been improved. Stability of sheet resistance value is further improved by preheating the sample.

Example 6

WE 8-13: CNT/PET with Different Topcoat Binders

Example #WE 8-13 in the Table 5 illustrate using more different polymers including both thermoplastics and thermoset as topcoat binders for the CNT based transparent conductive coating. A sheet of PET (Melinex ST 505, 5 mil, available from Dupont Teijin) was spray-coated with CNT. Its sheet resistance was about 500 O/€ while light transmittance was about 89-90% at the wavelength of 550 nm. Different binders were evaluated as topcoat. In addition to polyester and PVDF, these also include Teflon AF (a thermoplastic fluoropolymer from Dupont) dissolved in Fluorinet FC75; SIFEL 611 (a thermal curable fluoropolymer available from Shin-Etsu) dissolved in the solvent X-70580 (available from Shin-Etsu), a nitrocellulose/acrylic polymer mixture ("NP resin" in short), and UV curable epoxy UV 15 without oxygen inhibition issue in air (available from Masterbond). Based on the results, selective utilization of polymer binders can result in property improvement including environmental resistance and flexibility.

Example 7

WE 14-21: CNT/PET with Topcoat Binders Coated at Different Concentrations

Example #WE 14-21 in the Table 6 illustrate using polymer binders at different concentration for the CNT based transparent conductive coating. A grade of CNT ink having higher quality (referred as "A-grade" ink) was used. A sheet of PET (Melinex ST 505, 5 mil, available from Dupont Teijin) was spray-coated with CNT. Its sheet resistance was about 500 O/€ while light transmittance was about 90-92% at the wavelength of 550 nm. The binders were dip-coated onto the sample manually. The testing results demonstrate the feasibility to adjust the properties by adjusting the binder concentration, in addition to the type of binder selected. Particularly this adjustment needs to correspond to the CNT quality. For example, for this CNT/PET coating made of an A-grade CNT ink, the polyester binder is one of the preferred binder. Its best concentration for this manual coating procedures, 0.13% of concentration is preferred for good balance in different properties.

Example 8

WE 22-25: CNT/PET with Polyester Topcoat Binders at Coating Process Conditions

Example #WE 22-25 in the Table 7 illustrate the feasibility of using coating binder conditions to adjust the properties. A grade of CNT ink having higher quality (referred as "A-grade" ink) was sprayed onto PET (Melinex ST 505, 5 mil, available from Dupont Teijin). Its sheet resistance was about 500 O/€ while light transmittance was about 90-92% at the wavelength of 550 nm. The binders were dip-coated onto the sample thorough automatic dip-coating process. The polyester solution at a certain concentration was filled into a tank to immerse the CNT/PET samples for a certain period of time. And then the solution was pumped out at a certain speed.

In Table 7, two set of processing conditions have been tried with slightly different concentrations. For the "quick" process initially tried, polyester solution is filled into a closed tank to immerse CNT/PET samples hanged in the middle. After immersion for 5 minutes, a liquid level is dropped at a rate of 2.5 inches per minute. After all the solutions are pumped out, the film is then pulled out and dried with 100° C. hot air in the entrance of the tank.

For the "slow" process subsequently tried to achieve better transparency, polyester solution is pumped into the tank to immerse the CNT/PET film hanged in the middle. After immersion for 20 minutes, the solution level is dropped at a rate of 0.5 inch per minute. After completely draining the solution, the film is then set in the closed tank for 30 minutes for drying at room temperature. The sample is finally dried at 85° C. in the oven for 10 minutes.

As shown in Table 7, using automatic dip coating at the same concentration of binder solution (0.13%) deliver different results obtained using manual dip coating process. The slow process gives better results at the same concentration. This slow process shows the main advantage in elimination of possible haze during the coating at high RH ambient conditions. 0.35% of polyester solution with the specified slow processing condition is preferred.

The proper selection in binder concentration, solution immersion time, coating speed, drying temperature and time, and other coating parameters can be used to adjust the resulting properties by changing the coating thickness.

Example 9

WE 26-33: CNT/PET with Different Coating Layer Structures

Table 8 shows the examples (#WE 26-33) having different coating layer structure. The topcoat and basecoat compositions are specified. The polyester used is LCC-4 available from Flexcon. The polymer mixture of thermal curable melamine/acrylic is LCC-5 available from Flexcon. All the concentration used is 1%. When thermoplastic polyester was used as the basecoat, CNT coating was pressed under heating and pressure conditions after spray coating. In the case of curable materials as basecoat, the layer is partially cured first to form a "B-stage" perform and then the CNT layer is pressed after spraying coating. Compared to the control, these samples using carbon nanotubes and polymer binders have significant advantages in improved abrasion resistance and flexibility.

Conductive polymers such as polythiophenes and different surface treatments through chemical or physical means are applicable to this invention. Multiple layers of coating structures can be fabricated in different approaches.

A transparent and conductive coating or film comprised of carbon nanotubes and a polymer binder which together form a network, wherein the polymer binder protects the coating or layer by infiltration into the network or functions as secondary conductive layer.

Transparent and conductive coatings or films preferably comprise a transparent substrate which is polymer films including both thermoplastics and thermosets including polyesters, polycarbonates, polyolefins, fluoropolymers, or glass ranging from regular glass to optical display type of glass.

Carbon nanotubes are preferably single walled carbon nanotubes (SWNT) having a desired range of dimension.

Preferred binders are thermoplastics or thermosetting polymers, or any combination of both, including polyesters, polyurethanes, acrylates, epoxies, melamines, silicones, fluoroplastics, fluoroelastomers, and any other copolymer or hybrid polymers via heating, visible light, UV, irradiation or moisture curing or any dual curing mechanisms.

Thermosetting polymers can be partially cured (B-staged) and used as basecoat before nanotube coating during the fabrication and permit the CNT coating and polymer binder coating to have interpenetration into each other.

In one preferred embodiment, polymers are hydrophobic in chemical nature for high moisture resistance, including regular and fluoro-containing thermoplastics, thermosets and elastomers as described herein.

In one preferred embodiment, polymers are thermoplastic having high molecular weight or thermoset with cross-linking structures for high abrasion resistance and thermal resistance.

In one preferred embodiment, preheat treatment of polymer binder/CNT/substrate gives higher heat stability in sheet resistance value.

In one preferred embodiment, polymers can be any conductive polymers including polythiophenes, polyanilines and their derivatives with substitution groups for high surface conductivity.

In one preferred embodiment, polymers can be chemically compatible with nanotube and the substrates to display good interpenetration, interfacial bonding and adhesion.

In one preferred embodiment, surface treatment with inorganic-organic hybrid compound is necessary to form interfacial bonding or binders itself. These include silanes, fluorosilane, metal alkoxides, and other related materials.

These polymers can be any selection or any combination of these preferred selections to achieve desired properties.

The coating layer structures (previously referred to as "construction structures") using nanotube and polymer binders can be in different sequences. One or multiple layers of polymers can be in a single layer only as either basecoat underneath the nanotube coating, or topcoat above the nanotube coating, or any combinations of both.

Polymer binders can be used as the basecoat only in between transparent substrates and carbon nanotube coating. The nanotube coating can be pressed into flexible thermoplastic or partially cured (B-staged) polymer binder layer.

Polymer binders can be used as the topcoat only on the surface of carbon nanotube coating on the transparent substrates.

The same or different polymers can be applied as combinations of basecoat and topcoat to sandwich the carbon nanotube coating, in which thermoplastic or partially cured (B-staged) polymer binders can be used as the basecoat in the process.

Single or multiple layers of binders and conductive layers can be in any combination of these described herein. A carbon nanotube coating is not limited to single layer.

Binder coating thickness can be adjusted by changing polymer binder concentration during the coating process for desired properties.

Binder coating thickness can be adjusted by changing coating speed during the coating process for desired properties.

Binder coating thickness can be adjusted by changing immersion time, coating angles and other coating processing parameters during the coating process for desired properties.

Table 9 shows example (#EX 1-12) having Teflon coating. Purified carbon nanotube ink dispersed in 3/1 IPA/water is sprayed onto the clean substrates such as PET and glass. Transparency (T %) at 550 nm while sheet resistance Rs are tested by DMM (two-point probe) method. T % value is tested by with and without reference to the blank substrate, respectively. Without reference to the substrate, T % represents the total transparency of the sample.

After dip coating in 1% of Teflon AF (grade 2400, Tg 240° C.) solution in FC 75, the samples are dried. The data of Rs and T % are measured with comparison to the initials before coating with fluoropolymers. Rs value is also verified with by using 4-point probe method.

As shown in Table 9, after coating with Teflon AF onto CNT/substrate, optical transparency is significantly improved. For the samples of CNT on glass, absolute increase in T % is 4.2% on average. Meanwhile, Rs decreases by 5-9% in the high conductivity range (Rs in the range of 100-2000 $\Omega/\Box$). Rs decreases by much higher percentage in the low conductivity range. Rs values tested by the two methods are generally consistent to each other. This type of combination is a surprising finding. Resistivity due to addition of a fluoropolymer as topcoat is decreased by a factor of about 10-50%, 10-20%, and more preferably, 20-50%. Transparency of the substrate is improved by greater than 60%, greater than 70%, greater than 80%, and more preferably, greater than 90% after addition of a fluoropolymer as a topcoat. Transmittance value is at least 5% greater than the corresponding transmittance value of the coating or film without said binder.

This coating also provides high abrasion resistance and good adhesion for CNT on glass. Adhesion is measured by Rs change % after peeling by scotch tape for 4 times. Abrasion resistance is measured by Rs change % after abraded by 100 g weight wrapped with 8 layers of cheese cotton cloth. Without Teflon AF coating, CNT/glass showed Rs increase by 409% after the tape peel test for 4 cycles, a Rs increase by 33600% after the abrasion test for 60 cycles. This is in sharp contrast to the samples with Teflon AF coating. For example, Ex. 1 showed no change in Rs at all after the peel test, and only 20% of Rs increases after abrasion for 60 cycles.

The similar finding has been also observed by using PET as substrate. As shown in Ex. 12, optical transparency is significantly improved after coating with Teflon AF. Abrasion resistance of CNT/PET coated with Teflon AF is also excellent (Rs increases by 3-9% after abrasion for 60 cycles). Its moisture resistance and thermal resistance are also very good.

Another benefit of the invention is that the fluorosolvent used for Teflon AF coating is compatible with sensitive substrates such as acrylic and polycarbonate. Therefore, this invention provides a broad range of application in display, electronic and ESD areas.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims.

TABLE 1

Comparative Examples

| | Comparative Examples (CE) | # CE 1 | # CE 2 |
|---|---|---|---|
| Material | No polymer binder | CNT/glass | CNT/PET |
| Moisture Resistance | Change in Rs from dry to RH75% after stabilized for 24 hrs | 88.8% | 15% |
| Thermal Resistance | Change in Rs after 125° C./2 hrs and then room temperature for 16 hrs) | 66% | 23% |
| Adhesion | Change in Rs after peeling using scotch tape for 4 times | 4100% | 0.9% |
| Abrasion Resistance | Change in Rs after abrasion for 60 cycles | 33600% | 1830% |
| Flexibility | Change in Rs after the folding test | — | 9% |

TABLE 2

| Working Examples (CE) | | # WE 1 | # WE 2 | # WE 3 | # WE 4 |
|---|---|---|---|---|---|
| Material | Substrate | CNT/glass | CNT/glass | CNT/glass | CNT/glass |
| | Polymer binder | 1% PVDF | 1% polyester (LCC-4) | 1% Melamine/acrylic (LCC-5) | 1% Melamine/acrylic (LCC-6)-more hydrophobic |
| Sheet Resistance (Rs, Ω/□) | Before binder coating | 630 | 826 | 790 | 676 |
| | After coating 1x | 721 | 858 | 979 | 883 |
| Moisture Resistance | Change in Rs from dry to RH75% after stabilized for 24 hrs | 27.5% | 22.4% | 37.0% | 21.7% |
| Sheet Resistance (Rs, Ω/□) | After coating 3x | 716 | 983 | 1246 | 1117 |
| Moisture Resistance | Change in Rs from dry to RH75% after stabilized for 24 hrs | 12.3% | 7.0% | 26.4% | 16.9% |
| Thermal Resistance | Change in Rs after 125° C./2 hrs and then room temperature for 16 hrs) | 25% | 33% | 11% | 9% |

TABLE 3

| Examples | | # CE 1 | # WE 5 | # WE 2 |
|---|---|---|---|---|
| Material | Substrate | CNT/glass | CNT/glass | CNT/glass |
| | Polymer binder | none | 0.125% polyester (LCC-4) | 1% polyester (LCC-4) |
| Adhesion | Change in Rs after peeling using scotch tape for 4 times | 4100% | 0.1% | 0.0% |
| Abrasion Resistance | Change in Rs after abrasion for 60 cycles | 33600% | 143% | 12% |

TABLE 4

| Working Examples (CE) | | # WE 6 | # WE 7 |
|---|---|---|---|
| Material | Substrate | CNT/PET | CNT/PET |
| | Polymer binder | 1% polyester (LCC-4) | 1% PVDF (Haylar SN) |
| Sheet Resistance (Rs, Ω/□) | Before binder coating | 525 | 474 |
| | After binder coating 1x | 636 | 612 |
| | After binder coating 3x | 755 | 694 |
| Moisture Resistance | Change in Rs from dry to RH75% after stabilized for 24 hrs | 2.0% | 6.1% |
| Thermal Resistance | Change in Rs after 125° C./2 hrs and then room temperature for 16 hrs) | 31% | 23% |
| Sheet Resistance (Rs, Ω/□) | After preheatment (125 C./2 hrs & cooling) | 1057 | 905 |
| Moisture Resistance | Change in Rs from dry to RH75% after stabilized for 24 hrs | 0.5% | 4.9% |
| Thermal Resistance | Change in Rs after 125° C./2 hrs and then room temperature for 16 hrs) | 6% | 3% |
| Abrasion Resistance | Change in Rs after abrasion for 60 cycles (weight 204 g for 6 × 8 cm size) | 52% | 133% |
| Flexibility | Change in Rs after the folding test | 7% | 4% |

TABLE 5

| Working Examples (CE) | | # WE 8 | # WE 9 | # WE 10 | # WE 11 | # WE 12 | # WE 13 |
|---|---|---|---|---|---|---|---|
| Material | Substrate | CNT/PET | CNT/PET | CNT/PET | CNT/PET | CNT/PET | CNT/PET |
|  | Polymer binder | NP resin | Teflon AF | PVDF (Hylar SN) | Polyester (Lcc-4) | UV curable Epoxy (UV15) | SIFEL 611 |
|  | Binder concentration | 0.13% | 1% | 1% | 1% | 1% | 1% |
| Conductivity | Change in Rs upon coating | 8% | 11% | 32% | 36% | 93% | 16% |
| Moisture Resistance | Change in Rs from dry to RH75% after stabilized for 24 hrs | 19% | 8% | 8% | 5% | 14% | 11% |
| Thermal Resistance | Change in Rs after 125° C./2 hrs and then room temperature for 16 hrs) | 22% | 18% | 10% | 13% | −5% | 9% |
| Abrasion Resistance | Change in Rs after abrasion for 60 cycles (weight 204 g for 6 × 8 cm size) | 2513% | 9% | 91% | 98% | 700% | 1364% |
| Flexibility | Change in Rs after the folding test | 10% | 6% | 3% | 5% | 5% | 0% |

TABLE 6

| Examples | | # CE 3 (comparative example) | # WE 14 | # WE 15 | # WE 16 | # WE 17 | # WE 18 | # WE 19 | # WE 20 | # WE 21 |
|---|---|---|---|---|---|---|---|---|---|---|
| Material | Substrate | CNT/PET | CNT/PET | CNT/PET | CNT/PET | CNT/PET | CNT/PET | CNT/PET | CNT/PET | CNT/PET |
|  | Polymer binder | — | Polyester | Polyester | Polyester | NP resin | NP resin | Nanosilicate | Nanosilicate | Nanosilicate |
|  | Binder concentration | — | 0.13% | 0.50% | 1.00% | 0.13% | 0.50% | 0.13% | 0.25% | 0.50% |
| Conductivity | Change in Rs upon coating | — | 27% | 70% | 99% | 10% | 12% | 43% | 57% | 95% |
| Moisture Resistance | Change in Rs from dry to RH75% after stabilized for 24 hrs | 14% | 7.0% | 6.7% | 6.6% | 12% | 12% | 11% | 17% | 15% |
| Thermal Resistance | Change in Rs after 125° C./2 hrs and then room temperature for 16 hrs) | 40% | 30% | 20% | 62% | 47% | 36% | 30% | 35% | 27% |
| Abrasion Resistance | Change in Rs after abrasion for 60 cycles (weight 204 g for 6 × 8 cm size) | 2993% | 231% | 105% | 84% | 1586% | 459% | 482% | 168% | 142% |
| Flexibility | Change in Rs after the folding test | 4% | 5% | 5% | 6% | 6% | 8% | 5% | 5% | 3% |

TABLE 7

| Examples | | # WE 14 | # WE 22 | # WE 23 | # WE 24 | # WE 25 |
|---|---|---|---|---|---|---|
| Material | Substrate | CNT/PET | CNT/PET | CNT/PET | CNT/PET | CNT/PET |
|  | Polymer binder | Polyester | Polyester | Polyester | Polyester | Polyester |
|  | Binder concentration | 0.13% | 0.13% | 0.25% | 0.25% | 0.35% |
|  | Coating process | Manual Dip-coating | Automatic Dip-coating (quick speed) | Automatic Dip-coating (quick speed) | Automatic Dip-coating (slow speed) | Automatic Dip-coating (slow speed) |
| Conductivity | Change in Rs upon coating | 27% | 4% | 8% | 11% | 20% |
| Moisture Resistance | Change in Rs from dry to RH75% after stabilized for 24 hrs | 7.0% | 15.0% | — | 10% | 5% |
| Thermal Resistance | Change in Rs after 125° C./2 hrs and then room temperature for 16 hrs) | 30% | 38% | 12% | 12% | 22% |
| Abrasion Resistance | Change in Rs after abrasion for 60 cycles (weight 204 g for 6 × 8 cm size) | 231% | 1059% | 973% | 373% | 137% |
| Flexibility | Change in Rs after the folding test | 5% | 4% | 3% | 1% | 3% |

TABLE 8

| | Examples | # WE 26 | # WE 27 | # WE 28 | # WE 29 | # WE 30 | # WE 31 | # WE 32 | # WE 33 |
|---|---|---|---|---|---|---|---|---|---|
| Material | Substrate | CNT/PET | CNT/PET | CNT/PET | CNT/PET | CNT/PET | CNT/PET | CNT/PET | CNT/PET |
| | Basecoat binder | — | Polyester | Polyester | Polyester | — | Melamine/acrylic | Melamine/acrylic | Melamine/acrylic |
| | Topcoat binder | Polyester | — | Polyester | Melamine/acrylic | Melamine/acrylic | — | Polyester | Melamine/acrylic |
| | Binder concentration | 0.5% | 0.5% | 0.5% | 0.5% | 0.5% | 0.5% | 0.5% | 0.5% |
| Abrasion Resistance | Change in Rs after abrasion for 60 cycles (weight 204 g for 6 × 8 cm size) | 370% | 39858% | 67% | 130% | 123% | 476% | 38% | 96% |
| Flexibility | Change in Rs after the folding test | 1% | 6% | 4% | 2% | 2% | 5% | 2% | 3% |

TABLE 9

| Working Examples | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Substrate | Glass | Glass | Glass | Glass | Glass | Glass | Glass | Glass | Glass | Glass | Glass | PET (ST505) |
| CNT ink quality (T % at 500 ohm/sq on glass) CNT/substrate | 88.8% T/500 ohm/sq | 91.5% T/500 ohm/sq | 89% T/500 ohm/sq | 89% T/500 ohm/sq | 89% T/500 ohm/sq | 89% T/500 ohm/sq | 89% T/500 ohm/sq | 89% T/500 ohm/sq | 89% T/500 ohm/sq | 89% T/500 ohm/sq | 89% T/500 ohm/sq | |
| Rs (ohm/sq) by DMM | 617 | 584 | 172.5 | 320.5 | 648 | 725 | 1385 | 6.4E + 03 | 1.3E + 04 | 1.3E + 05 | 1.8E + 06 | (500–600) |
| T % (reference to substrate) | 90.2% | 92.3% | 78.4% | 87.0% | 90.7% | 92.5% | 95.1% | 98.1% | 98.8% | 99.3% | 99.6% | 88.4% |
| Total T % CNT/substrate after coated with Teflon AF | | 84.7% | 72.0% | 80.0% | 83.2% | 84.6% | 87.3% | 90.1% | 90.6% | 91.2% | 91.4% | 79.9% |
| Rs (ohm/sq) by DMM | 562 | 541.5 | 164.5 | 297 | 596.5 | 681.5 | 1266.5 | 5.6E + 03 | 1.1E + 04 | 1.1E + 05 | 1.2E + 06 | |
| T % (with reference to substrate) | 94.2% | 96.4% | 82.5% | 91.5% | 94.8% | 96.8% | 99.1% | 102.0% | 102.8% | 103.6% | 104.0% | 92.2% |
| Total T % | 86.5% | 88.4% | 75.8% | 84.0% | 87.1% | 88.3% | 90.8% | 93.5% | 94.1% | 94.6% | 95.0% | 83.6% |
| Absolute Increase T % (with reference) | 4.0% | 4.1% | 4.1% | 4.5% | 4.1% | 4.3% | 4.0% | 3.9% | 4.0% | 4.3% | 4.4% | 3.8% |
| Absolute Increase total T % | | 3.7% | 3.8% | 4.0% | 3.9% | 3.7% | 3.5% | 3.4% | 3.5% | 3.4% | 3.6% | 3.7% |
| Percentage change in Rs % | −8.9% | −7.3% | −4.6% | −7.3% | −7.9% | −6.0% | −8.6% | −11.8% | −14.9% | −15.9% | −31.9% | |
| Rs (ohm/sq) by 4-point probes | | | 265 | | | | | 5.E + 03 | | | | |

T %: transparency at 550 nm of wavelength;
Rs: sheet resistivity (inversely representing surface conductivity
Teflon AF for dip coating: 1% solution of grade 2400 in Fluorinet FC 75

The invention claimed is:

1. A method of forming a conductive optically transparent coating or film comprising applying to a substrate a layer of carbon nanotubes having an open structure and a separate layer of a applying another layer of material to said carbon nanotube layer that interpenetrates and compresses said carbon nanotubes and increases sheet conductivity across a surface of said conductive film.

2. The method of claim 1, wherein the coating or film has a transmittance value to light at 550 nm of greater than 65%.

3. The method of claim 2, wherein the transmittance value is greater than 90%.

4. The method of claim 2, wherein the transmittance value to light at 550 nm is greater than the corresponding transmittance value of the coating or film without said binder.

5. The method of claim 2, wherein the transmittance value is at least 5% greater than the corresponding transmittance value of the coating or film without said binder.

6. The method of claim 5, wherein the transmittance value is up to 50% greater than the corresponding transmittance value of the coating or film without said binder.

7. A method of increasing the conductivity of a conductive film comprising: applying a layer of carbon nanotubes having an open structure to a surface to form a conductive film; applying another layer of material to said carbon nanotube layer that interpenetrates and compresses said carbon nanotubes and increases sheet conductivity across a surface of said conductive film.

8. The method of claim 7, wherein the another layer contains a fluoropolymer or fluoromonomer binder.

9. The method of claim 8, wherein the film is at least 75% transparent to visible light.

10. The method of claim 8, wherein the film is at least 90% transparent to visible light.

11. The method of claim 9, wherein the film has a sheet resistance of from $10^{-1}$ to $10^4$ Ω/□.

12. The method of claim 10, wherein the film has a sheet resistance of from $10^1$ to $10^3$ $\Omega/\square$.

13. The method of claim 11, wherein the sheet resistance is up to 10% less than the corresponding sheet resistance of the film without said binder.

14. The method of claim 12, wherein the sheet resistance is up to 50% less than the corresponding sheet resistance of the film without said binder.

* * * * *